United States Patent [19]

Hager, Jr.

[11] 4,167,116
[45] Sep. 11, 1979

[54] METHOD OF DETERMINING HEAT LOSSES THROUGH ELECTRICAL OUTLETS

[75] Inventor: Nathaniel E. Hager, Jr., Lancaster, Pa.

[73] Assignee: Armstrong Cork Company, Lancaster, Pa.

[21] Appl. No.: 930,880

[22] Filed: Aug. 4, 1978

[51] Int. Cl.² .............................................. G01F 1/28
[52] U.S. Cl. ................................... 73/228; 73/190 H
[58] Field of Search ........................... 73/228, 190 H; 116/114 P, 117 R

[56] References Cited

U.S. PATENT DOCUMENTS

| | | | |
|---|---|---|---|
| 3,381,530 | 5/1968 | Lamb | 73/228 X |
| 3,442,125 | 5/1969 | Foley | 73/228 |
| 3,636,766 | 1/1972 | Austin | 73/228 |
| 3,955,415 | 5/1976 | Sharon | 73/228 |

Primary Examiner—Herbert Goldstein

[57] ABSTRACT

A method is provided for determining the heat energy lost by air infiltration through electrical outlets. A film is used to measure air flow through the outlet. Air flow is cross indexed with a climatic factor determined from a geographic chart to arrive at an energy loss figure.

4 Claims, 2 Drawing Figures

METHOD OF DETERMINING HEAT LOSSES THROUGH ELECTRICAL OUTLETS

BACKGROUND OF THE INVENTION

The present invention relates to methods of determining heat energy losses by air infiltration through electrical outlets.

An important source of heat energy loss in conventional building structures is air infiltration through gaps and cracks in walls and in construction surrounding windows and doors. It has been empirically established that approximately 20% of all air infiltration in residential buildings is attributable to losses through electrical outlets on the inside of exterior walls. Electrical outlets, including the electrical boxes in which they are disposed, comprise a gap in the insulation system of conventional buildings through which heated air is readily lost from the building and through which cold air may be admitted into the structure. In view of the large amount of heat energy lost through electrical outlets, a method of determining the extent of these losses would be very useful.

The principal object of the present invention is to provide a simple method for determining the heat energy lost through electrical outlets in buildings.

A further object of the present invention is to provide a method for determining the cost of heat energy losses through electrical outlets, which method is easy to employ, rapid in use, low in cost, and otherwise well adapted to the purposes for which the same is intended.

SUMMARY OF THE INVENTION

A method for determining heat energy losses by air infiltration through electrical outlets in the exterior walls of buildings is provided. The top of a metalized film is affixed to the top of an electrical outlet. The distance the bottom of the film blows out from the faceplate is measured. This distance is correlated with an air flow rate. A chart is used to correlate the geographic location of the building with a climatic factor related to the severity and duration of cold weather. The air flow rate is cross indexed with the climatic factor to arrive at an average annual cost of heat energy lost through the outlet.

DESCRIPTION OF THE PREFERRED EMBODIMENT

Figure 1:
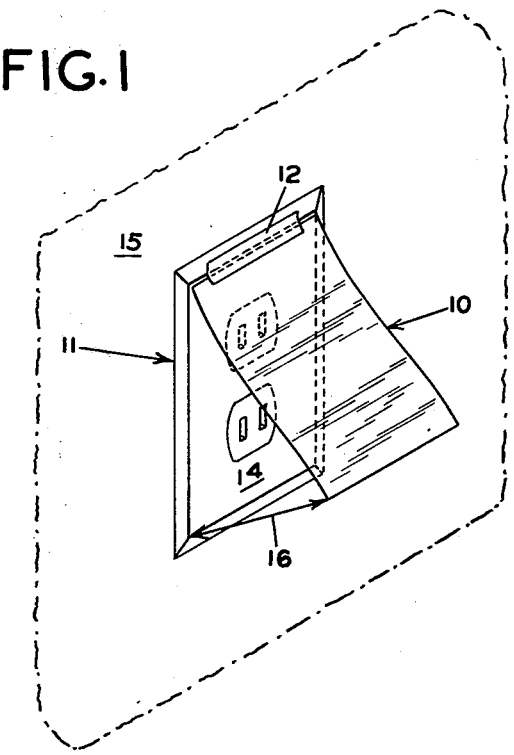
FIG. 1 shows a perspective view of an apparatus used in the present invention installed on an electrical outlet.

Referring now to FIG. 1, a rectangular thin and flexible sheet 10 having a thickness range of about 0.5-5 mils, and a maximum mass per unit area of 0.02 gram per square centimeter is adhered to the top of a conventional electrical outlet 11 by tape 12. The sheet 10 is preferably a polyethylene terephthalate (Mylar) film approximately 1 mil thick having a thin layer of vapor deposited aluminum approximately 100 angstrom thick on one side to minimize static electricity effects. The film 10 is of a size sufficient to cover an electrical outlet, approximately 2¾ inches wide and 4¼ inches long. Tape 12 may be of any type suitable to adequately secure the film 10 to the top of the outlet 11. However, the tape 12 should preferably not extend over the film 10 to a distance greater than ¼ inch, and the tape should be secured to the faceplate 14 of the outlet 11 so as to leave the film free floating over the outlet from a distance not greater than ¼ inch from the top edge of the faceplate 14, so as to substantially cover the faceplate.

In operation, air infiltration through the outlet 11 causes the film 10 to be blown out from the faceplate 14 and the wall 15. On a typical day, with a local average wind velocity of 15 mph against the outside of wall 15, the displacement 16 of the bottom edge of the film 10 away from the surface of the faceplate 14 may be measured and correlated with an air flow rate through the outlet 11. Table I below provides a listing of approximate correlations between film displacement and air flow. The air flow is determined by entering the measured displacement into Table I and reading from the table the corresponding air flow rate through said outlet.

Table I

| Distance Between Bottom Edge of Film and Bottom Edge of the Faceplate | Air Flow Rate Cu. Ft./Min. |
| --- | --- |
| 0.5" | 1.0 |
| 1.0" | 1.5 |
| 1.5" | 2.0 |
| 2.0" | 2.4 |
| 2.5" | 3.0 |
| 3.0" | 4.7 |

Figure 2:
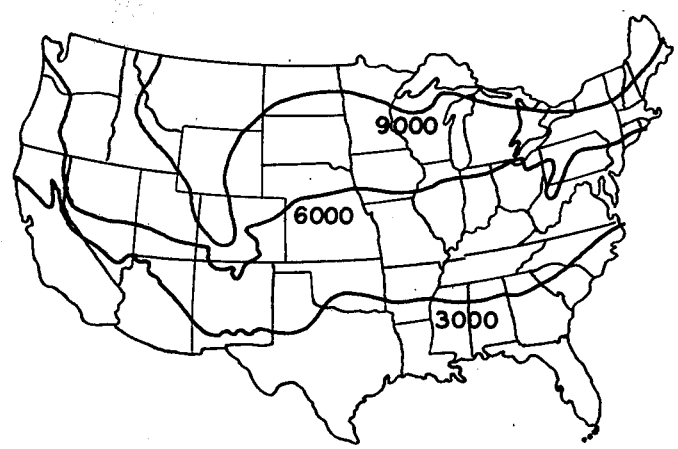
FIG. 2 shows a geographic map of the United States including degree-day lines as determined by climatic data.

Once the approximate air flow rate through the outlet 11 has been determined, FIG. 2 should be consulted. FIG. 2 is a chart showing geographic map of the Unites States which provides correlations between geographic locations and climatic positions through the use of degree-day lines. Degree-day lines are based on climatic data and represent the locations at which the annual sum of the number of degrees the average temperature is below 65° F. on a daily basis is equal to some predetermined level. As such, degree-day lines are a measure of climatic position related to the severity of winter weather conditions. FIG. 2 shows lines 20, 21 and 22 representing the 3000, 6000, and 9000 degree-day levels across the United States. The geographic location of the building in which the outlet is installed should be correlated with a degree-day line by entering said location on the chart, by observing which line the location is closest to, and then reading from the chart the climatic position corresponding to the geographic location.

Once the climatic position of the building is determined, the air flow rate and the degree-day line selected should be cross indexed on Table II below by entering the air flow rate and the climatic position previously determined into the table and reading from the table a heat loss figure.

Table II

| Air-Flow Rate | 3000 degree-days | 6000 degree-days | 9000 degree-days |
| --- | --- | --- | --- |
| 1.0 | $ 2.34 | $ 4.68 | $ 7.02 |
| 1.5 | 3.51 | 7.02 | 10.53 |
| 2.0 | 4.68 | 9.36 | 14.04 |
| 2.4 | 5.62 | 11.24 | 16.86 |
| 3.0 | 7.02 | 14.04 | 21.06 |
| 4.7 | 10.99 | 21.98 | 32.97 |

The dollar figure arrived at by cross indexing represents an approximate estimate of the average annual cost of the heat energy lost through six outlets similar to the one whose air infiltration rate was measured. The figures on Table II were calculated using standard American Society of Heating, Refrigeration, and Air-Conditioning Engineers' methods and assuming an energy cost of $5.00 per million BTU. Alternatively, Table II could be provided with figures representing approximate estimates of average annual BTU losses through electrical outlets. In this case, further tables would be provided to cross index these BTU losses with different levels of heat energy cost to arrive at commonly experienced with different fuels to arrive at approximate estimated cost of heat energy losses.

Therefore, there has been provided a simple method whereby an approximate estimate of the costs of heat energy loss through electric outlets may be determined. This method and the information it provides allows the extent of the costs of heat energy losses to be determined so that the desirability of taking action to avoid such losses may be gauged. For example, if after taping the herein described metalized film to an outlet as specified it is determined that the film is displaced 1 inch, then the air-flow rate may be correlated using Table I to be 1.5 cu. ft./min. If the location of the building in which the outlet is installed is Chicago, Ill., then this location correlates on FIG. 2 with a 6000 degree-day climatic position. If this climatic position and the air-flow rate are cross indexed on Table II, then it is determined that the cost of heat energy linkage through 6 similar outlets would be approximately $7.02 on an average annual basis. This dollar figure provides a gauge of the extent and financial importance of modifying the energy outlets tested to reduce air infiltration therethrough.

What is claimed is:

1. A method for determining the costs of heat energy losses by air infiltration through an electrical outlet, comprising the steps of:
   (a) adhering the top of a sheet of metalized film to the top of the outlet,
   (b) measuring the displacement of the bottom edge of the film from the faceplate of the outlet,
   (c) correlating said displacement with an air-flow rate using a table,
   (d) correlating the geographic location of the building in which the outlet is installed with a climatic position using a geographic chart, and
   (e) cross indexing the air-flow rate with the climatic position on a table to arrive at an approximate estimated cost of energy losses through the outlet on an average basis.

2. The method of claim 2, wherein:
   (a) said cross indexing step arrives at an approximate estimate of heat energy loss through the outlet on an average basis and further including the step of:
   (b) cross indexing said heat energy loss with levels of heat energy cost to arrive at an approximated cost of energy losses through the outlet on an average basis.

3. A method of determining the air flow rate into the interior of a building through an electrical outlet positioned in an exterior wall of the building comprising the steps of:
   (a) providing a thin, flexible sheet having a thickness in the range of about 0.5–5 mils, a maximum mass per unit area of 0.02 gram per square centimeter, and of a size sufficient to cover an electrical outlet,
   (b) affixing said sheet along one edge thereof to the topmost portion of said electrical outlet to position said sheet to substantially cover the faceplate of said outlet whereby air leakage through said outlet causes the bottom of said sheet to stand away from the bottom of said faceplate,
   (c) measuring the displacement between the bottom of said faceplate and the bottom of said sheet,
   (d) entering said measured displacement into Table I and reading from said Table I the corresponding air flow rate through said outlet
   (e) entering the geographical location of the building into the chart of FIG. 2, and reading from said chart a climatic position, and
   (f) entering said air flow rate arrived at in step (d) and said climatic position arrived at in step (e) into Table II and reading from said Table II the BTU heat loss through said outlet on an average annual basis for six outlets.

4. The method of claim 3, wherein the step of entering said air flow rate and said climatic position into Table II arrives at an approximate estimated cost of energy losses through the outlet on an average basis.

* * * * *